US012612255B2

(12) United States Patent
Vestergaard et al.

(10) Patent No.: US 12,612,255 B2
(45) Date of Patent: Apr. 28, 2026

(54) PRODUCT CONVEYING SYSTEM AND PRODUCT SUPPORT SYSTEM

(71) Applicant: POWER STOW INTERNATIONAL APS, Gadstrup (DK)

(72) Inventors: Martin Vestergaard, Gadstrup (DK); Jens Bonde, Gadstrup (DK)

(73) Assignee: POWER STOW INTERNATIONAL APS (DK)

( * ) Notice: Subject to any disclaimer, the term of this patent is extended or adjusted under 35 U.S.C. 154(b) by 52 days.

(21) Appl. No.: 18/564,770

(22) PCT Filed: Jun. 3, 2022

(86) PCT No.: PCT/EP2022/065244
§ 371 (c)(1),
(2) Date: Nov. 28, 2023

(87) PCT Pub. No.: WO2022/254031
PCT Pub. Date: Dec. 8, 2022

(65) Prior Publication Data
US 2024/0270498 A1 Aug. 15, 2024

(30) Foreign Application Priority Data
Jun. 3, 2021 (EP) ..................................... 21177563

(51) Int. Cl.
B65G 13/12 (2006.01)
(52) U.S. Cl.
CPC .......... B65G 13/12 (2013.01); B65G 2201/02 (2013.01)

(58) Field of Classification Search
None
See application file for complete search history.

(56) References Cited

U.S. PATENT DOCUMENTS

| | | | | |
|---|---|---|---|---|
| 2,099,221 A | * | 11/1937 | Paxton ................. | A23N 12/005 |
| | | | | 15/3.17 |
| 3,087,599 A | * | 4/1963 | Nelson ................. | A46B 13/003 |
| | | | | 198/780 |

(Continued)

FOREIGN PATENT DOCUMENTS

| | | |
|---|---|---|
| GB | 1329007 A | 9/1973 |
| IT | 20100001 A1 | 7/2011 |

(Continued)

OTHER PUBLICATIONS

International Search Report and Written Opinion for International Application No. PCT/EP2022/065244, mailed on Sep. 22, 2022.

Primary Examiner — Kavel Singh
(74) Attorney, Agent, or Firm — Edmonds & Cmaidalka, P.C.

(57) ABSTRACT
The present invention relates to a product conveying and product support system for conveying objects (18), such as luggage or packages, and comprises a number of subsequently arranged conveying elements (12) defining a conveying direction. The system comprises at least one first brush element (20) for supporting objects (18) and has a base element (24) and a number of elongated deflector elements (26) connected to the base element (24) and connected to the conveying elements (12) at an oblique angle in relation to said conveying direction.

18 Claims, 9 Drawing Sheets

(56)         References Cited

U.S. PATENT DOCUMENTS

| | | | | |
|---|---|---|---|---|
| 3,428,162 | A * | 2/1969 | Niederer | B65B 23/06 |
| | | | | 198/779 |
| 4,911,284 | A * | 3/1990 | Weihe | B65G 13/02 |
| | | | | 198/465.1 |
| 5,331,874 | A * | 7/1994 | Foster | B26D 7/0625 |
| | | | | 83/423 |
| 5,687,833 | A * | 11/1997 | Dalessio, Jr. | B65G 39/06 |
| | | | | 198/786 |
| 5,823,318 | A * | 10/1998 | Baur | B65G 47/082 |
| | | | | 198/408 |
| 7,926,645 | B2 * | 4/2011 | Contoli | B65G 51/03 |
| | | | | 198/721 |
| 9,205,989 | B1 | 12/2015 | Leslie | |
| 9,670,006 | B2 * | 6/2017 | Ruigrok | B65G 47/24 |
| 9,694,980 | B1 | 7/2017 | Leslie | |
| 9,731,902 | B2 | 8/2017 | Balsells Mercadé | |
| 10,865,045 | B2 * | 12/2020 | Gaßner | B65G 17/065 |
| 11,845,611 | B2 * | 12/2023 | Balsells Mercade | B65G 15/58 |

FOREIGN PATENT DOCUMENTS

| | | | |
|---|---|---|---|
| JP | S61206712 A | 9/1986 | |
| JP | 2015147682 A | 8/2015 | |

* cited by examiner

PRODUCT CONVEYING SYSTEM AND PRODUCT SUPPORT SYSTEM

CROSS REFERENCE TO RELATED APPLICATION

This patent application claims the benefit and priority of International Application No. PCT/EP2022/065244 filed on Jun. 3, 2022, the disclosure of which is incorporated by reference herein in its entirety.

TECHNICAL FIELD

The present invention relates to a product conveying system and a product support system. The product conveying system and product support system is particularly suitable to be used in combination with loading and/or unloading of objects, such as packages or luggage, which is loaded and/or unloaded from vehicles, aircrafts or within warehouses, etc.

BACKGROUND OF THE INVENTION

Within the technical field of loading and/or unloading of goods, such as e.g. packages and luggage, from transportation means, such as aircrafts, the handling of the goods is a demanding task on both the personal and the equipment used for the task. Especially the loading of cargo to and from cargo storage spaces in e.g. aircraft hulls, where the space is extremely limited, the equipment for transferring the goods to and from the storage space has to be easy to operate, flexible to move within the space, and has to provide the necessary support and guidance of the goods.

One example of such transferring equipment is disclosed in EP1713704A1, which describes a conveying device for handling the loading and unloading of goods.

Other examples of known transferring equipment would be commonly known roller or belt conveyors comprising a number of rollers or belts separated by a distance.

A major problem associated with transferring goods via transferring equipment, such as conveying devices having a number of rollers or conveyor belts separated by a distance, such that there is an intermediate gap, is that goods of smaller sizes will not be fully supported on the conveying device, and the smaller goods, such as small packages, have an increased risk of being stuck between two conveying elements, such as rollers or belts.

Larger objects, such as suitcases or large boxes, will span these gaps and will not get stuck, but due the always wide variety of sizes and forms of the transferred goods, small packages and objects of non-uniform sizes may get stuck between two neighbouring conveying elements and block the entire conveying device.

In the known linear conveyor systems, where the goods are transported along a transportation path being a substantially straight line, the distance between the rollers or belts may by adjusted to a minimum, whereby smaller objects will not get stuck.

However, in relation to the conveying devices disclosed in EP1713704A1, the conveying elements described as rollers are arranged such that the direction of their axis of rotation can be adjusted from parallel to non-parallel. The conveying device may thus be arranged with a straight path of transportation, where the axis of rotation of the rollers is arranged substantial parallel, and in a non-straight path of transportation, where the axis of rotation of the rollers is arranged non-parallel.

When the rollers, such as at least two rollers, are arranged in a non-parallel configuration, the distance, also referred to as a gap, is smaller towards one end of the rollers compared to the opposite end of the rollers. It is here not possible to arrange a smaller gap as the rollers must be non-parallel. Thus, along the entire distance between two rollers, the gap increases from a gap of relatively short distance at one end into a gap of relatively large distance at the opposite end. In such a situation, goods of smaller and/or non-uniform size have an increased risk of getting stuck between the rollers and block the entire conveying device.

SUMMARY OF THE INVENTION

It is an object of the present invention to provide a product conveying system and a product support system which eliminates the above defined problem.

It is an object of the invention to provide a product conveying system in which the risk of blockage is eliminated.

It is a further object of the invention to provide a product supporting system which can be installed in any of the known systems described above.

The above objects and advantages, together with numerous other objects and advantages, which will be evident from the following description of the present invention, are according to a first aspect of the present invention obtained by:

A product conveying system for conveying objects, such as luggage or packages, comprising a number of subsequently arranged conveying elements defining a conveying direction, the product conveying system further comprising a product support system having at least one brush element for supporting the objects, the conveying elements having a moveable conveying surface for contacting the objects and wherein the at least one brush element is arranged between two of the subsequently arranged conveying elements and comprises a base element and a number of elongated deflector elements and is connected to the conveying elements such that the deflector elements form an oblique angle in relation to the conveying direction.

The invention covers a product conveying system as defined, whereby is possible to convey a variety of different products, such as luggage or packages of different size and shapes, without the risk of the objects getting stuck between individual conveying elements, with the result of blocking the conveyor. It is understood that the product conveying system can be operated in both directions for conveying objects in both directions.

The conveying elements are preferably active conveying elements, such as activated or motorized rollers or conveyor belts, but may be passive conveying elements, such as freely rotatable rollers or conveyor bands providing an "endless conveying surface.

The brush element does not in itself, compared to the activated or passive conveying elements, contribute to any conveyance, but merely prevents any objects from getting stuck between two subsequently arranged conveying elements.

The brush element, which is arranged between two subsequently arranged conveying elements, such as two rollers or two subsequently arranged conveyor belts, arranges a flexible support, thus preventing any objects in getting stuck between two conveying elements.

The base element may be manufactured from any material suitable for forming a base for the deflector elements, and may thus be made from different materials, such as plastics, wood, metal, etc.

The deflector elements may be stiff but are preferably arranged as flexible elements which can bend in relation to the base element, such that when conveying objects against the direction of the oblique deflector elements, the deflector elements can bend and support the objects in the opposite direction as well.

The brush element has a number of deflector elements, which when connected to the conveying system has an oblique angle in relation to the conveying direction.

Arranging the brush element such that the deflector elements form an oblique angle in relation to the conveying direction reduces the required number of deflector elements, compared to an arrangement where the deflector elements are arranged substantially perpendicular to the conveying direction.

Further, the oblique deflector elements span a greater width between two subsequently arranged conveying elements, compared to perpendicularly arranged deflector elements. Hereby, the base element supporting the deflectors may be arranged as more slim or narrow element, compared to the upper surface of the deflector element. The base element therefore occupies minimum space between the conveying elements and is hereby easy to install and minimises the interference between the base element and the conveying element, providing a less complicated conveying system.

Further, the oblique angle of the deflector element provides the possibility of arranging the conveyor system as a conveying system having a varying conveying direction as disclosed in EP1713704A1. As explained above, when the trajectory of such conveyor system varies, and the gap between the subsequently arranged rollers increases from a gap of relatively short distance at one end into a gap of relatively large distance at the opposite end, goods of smaller and/or non-uniform size would have an increased risk of getting stuck between the rollers and block the entire conveying device, which, due to the arrangement of the obliquely arranged deflector elements, is avoided.

According to a further embodiment of the first aspect of the invention, the subsequently arranged conveying elements comprise at least two subsequently arranged conveying rollers or two subsequently arranged conveyor belts.

The conveying system comprises at least two subsequently arranged conveying rollers or two subsequently arranged conveyor belts. When the system comprises rollers, the system preferably comprising a plurality of rollers having a brush element arranged between at least two subsequently arranged rollers, it is possible to arrange longer conveying systems and incorporate one or more brush elements along the conveyor system, which provides a more flexible conveying system.

According to a further embodiment of the first aspect of the invention, the brush element is elongated and arranged such that the longitudinal direction of the brush element is substantially perpendicular to the conveying direction in a horizontal plane.

Conveying systems are typically arranged with conveying elements having a width being larger compared to the gap between two subsequently arranged conveying elements. The elongated brush element thus has the advantage of being able to be incorporated into existing conveying system, whereby minimal modification or even no modification is required for installation.

According to a further embodiment of the first aspect of the invention, the base element of the at least one brush element is arranged offset in relation to a centerline between two subsequently arranged conveying elements.

Arranging the brush element such that, when being connected to the conveying system, such as between two conveying elements being two neighbouring rollers or two neighbouring conveyor belts or ball conveyors, the deflector elements form an oblique angle in relation to the conveying direction, provides the possibility of arranging the deflector element towards one of the conveying elements and hereby in an offset position in relation to a centerline parallel between the two conveyor elements.

This has the technical advantage that the support system can be connected to, or in connection with, one of the conveying elements such that the conveying elements can be displaced and/or pivoted in relation to each other, without the support system preventing any movement of the conveying elements.

The base elements of the brush elements are hereby arranged offset in relation to the centerline between two subsequently arranged conveying elements and hereby closer to one of the conveying elements.

According to a further embodiment of the first aspect of the invention, the conveying elements comprise at least two subsequently arranged rollers and a link element arranged as a connection between the rollers.

In a basic embodiment of the invention, the support system comprises a number of first brush elements, minimum one, but preferably two brush elements, when used in combination with a system such as the one disclosed in EP1713704A1.

The conveying system, which comprises a number of conveying elements, each having at least one roller and interconnected via a link element such that the conveying element can articulate in relation to each other, generates an extremely flexible conveying system. The system may hereby be arranged in a cargo hold, and by the personnel carrying out the loading or unloading, the conveyor may be pushed or pulled into an appropriate location in relation to the cargo that needs to be stacked or removed.

Due to the flexibility and the articulation of the conveyor elements, it is necessary for the conveying elements to move relatively freely in relation to each other.

The trajectory of the conveying system may thus be arranged non-linearly, whereby the conveying system can be arranged as a flexible conveying system where the gap between the subsequently arranged rollers increases from a gap of relatively short distance at one end into a gap of relatively large distance at the opposite end, goods of smaller and/or non-uniform size would have an increased risk of getting stuck between the rollers and block the entire conveying device, which due to the arrangement of the obliquely arranged deflector elements is avoided.

According to a further embodiment of the first aspect of the invention, the base element of the at least one brush element is arranged at least partly under the at least one roller.

By arranging the base elements at least partly under the at least one roller in relation to the conveying direction and/or the vertical direction, the base elements will not prevent any movement of the conveying elements.

According to a further embodiment of the first aspect of the invention, the product support system further comprises a second brush element for supporting the objects and having a base element and a number of elongated deflector elements connected to the base element, the second brush element being connected above the link element between subsequently arranged conveying elements.

When being used in such a system or similarly, the conveying system comprises a second brush element in connection with a conveying element and arranged proximate the conveying element intermediate two first brush elements, hereby extending in a gap between the first brush elements and two neighbouring conveying elements.

The second brush element is preferably connected with the conveying element such that the second brush element, at least partly, spans the area above the link element.

The first and second brush elements may be arranged as separate brush elements, however, may also be arranged as one continued brush element extending along the at least one roller and over the link element, or arranged as individual interconnected brush elements.

In order for the second brush element to have a support surface having the substantial same plane as the support surface of the first brush element, the length of the elongated deflector elements of the second brush is preferably shorter compared to the length of the elongated deflector elements of the first brush element.

According to a further embodiment of the first aspect of the invention, the deflector elements are arranged at different angles in relation to a direction perpendicular to the conveying direction, hereby defining a spread of the angles.

In a basic embodiment of the invention, the deflector elements of the first brush element are all arranged substantially parallel and at an oblique angle in relation to the conveying direction. However, in a preferred embodiment, the deflector elements are arranged at different angles in relation to the conveying direction, hereby forming a spread of angles. Arranging the deflector elements with a spread of angles reduces the required number of deflector elements even more and arranges the support system with an even greater span between two conveying elements.

A further advantage of arranging the deflector elements with a spread of angles is that when the support system is arranged in connection with a conveying element, the deflector elements closest to the conveying element will have an angle closer to perpendicular in relation to the conveying direction compared to the deflector elements arranged furthest from the associated conveying element and towards the neighbouring conveying element, which deflector elements will have a more oblique angle.

According to a further embodiment of the first aspect of the invention, the spread of the first brush element increases from one end towards an opposite end of the first brush element.

The rollers are preferably conical rollers which are outwardly tapered, whereby the gap between two subsequent rollers increases from the center of the conveying system towards the side of the system. The first brush elements are therefore preferably arranged with a spread which increases from the end of the brush elements that faces the outside of the conveyor system towards the opposite end which faces the center of the conveyor element.

The rollers may however also be straight/non-conical, whereby the first brush elements may have the same spread between both ends.

Alternatively, the rollers are arranged conically, and the first brush elements are arranged in relation to the rollers, such that the brush elements are substantially parallel with the conical surface of the rollers, whereby the first brush elements may have the substantially same spread between both ends According to a further embodiment of the first aspect of the invention, the first brush element is in contact with one of the conveying elements such that the increase of the spread is influenced by the contact.

The deflector elements are preferable arranged flexible, and the increase of spread may be influenced by the contact between the deflector element and the conveying element. As the deflector elements are arranged flexibly and in contact with the conveying elements, the brush element may be arranged standard and compatible with conveying element of varying sizes.

According to a further embodiment of the first aspect of the invention, the angles define a spread of approximately 10-50 degrees, preferably approximately 20-40 degrees, most preferably approximately 25-35 degrees.

Experiments by the applicant have shown that the most optimal spread of angles is between 10-50 degrees, preferably approximately 20-40 degrees, most preferably approximately 25-35 degrees, such as e.g. 30 degrees, whereby the most optimal relationship between object support and coverage of the gap between to neighbouring conveying elements is achieved.

According to a further embodiment of the first aspect of the invention, the deflector elements comprise a number of bundles of brush fibers.

As described above, the deflector elements are preferably arranged at different angles in relation to the conveying direction, hereby providing a spread of angles.

The deflector elements are preferable arranged as bundles of brush fibers made from a suitable material, such as natural fibers or plastic fibers, such as PCV, and having a thickness preferably between 1-2 mm. The fibers may have a smaller or greater thickness depending on the intended use of the conveyor system. The deflector elements may in an alternative embodiment be arranged as thicker elements compared to the brush fibers, such as e.g. rubber "fingers" or the like. Arranging the deflector elements as bundles of fibres increases the contact between the brush and the objects, hereby providing a more uniform support.

According to a further embodiment of the first aspect of the invention, the at least one bundle of fibers comprises a number of brush fibers arranged at different angles in relation to the conveying direction.

The deflector elements are in a preferred embodiment arranged as bundles of brush fibers, where a single bundle comprises a number of fibers arranged at different angles compared to the conveying direction. Thereby, fibers from two or more individual bundles will cross each other, forming a weave of fibers with increased support.

According to a second aspect of the present invention, the above objects and advantages are obtained by:

A product support system suitable for use in a product conveying system according to the first aspect of the invention, the product support system comprising at least a first brush element for supporting the objects, having a base element and a number of elongated deflector elements connected to an upper surface of the base element and suitable for being connected to the conveying elements at an oblique angle in relation to the conveying direction, the deflector elements being arranged at different angles, and an upper end of the deflector elements defining a deflector surface having an area covering a larger surface area compared to the upper surface of the base.

By the above defined support system, it is possible to arrange a product conveying system for conveying a variety of products such as luggage or packages of different size and shapes without the risk of the objects getting stuck between individual conveying elements, with the result of blocking the conveyor.

The upper end of the deflector elements defines a deflector surface having an area covering a larger surface area compared to the upper surface of the base. Thus, the surface area of the base element is smaller than the deflector surface area, which results in easier incorporation of the brush element into existing conveying systems.

The brush element may in a further embodiment have a height with an upper end defined by the deflector elements opposite the base element, and where the height of the first brush element decreases from one side of the brush element towards an opposite side of the first brush element.

The brush element has an upper surface defined by an upper end of the deflector elements, which when connected to the conveying system, together with the surface of the conveying elements, defines a conveying surface. When arranging the first brush element proximate one of two neighbouring conveying elements, such that the deflector elements form an oblique angle with the conveying direction, it is preferred that the upper surface of the brush element has a plane substantially parallel with the conveying direction, which provides optimal support for the conveyed objects. It is therefore preferred that the height of the brush element towards the side facing the associated conveying element is shorter compared to the side of the brush element facing the neighbouring conveying element, whereby when the deflector elements are arranged at an oblique angle in relation to the conveying direction, the upper surface of the brush element forms a surface being substantially parallel with the conveying direction, which provides optimal support.

In a further embodiment, the deflector elements may have the same length, but the base element has a varying height, where the height of the base element towards the side facing the associated conveying element is shorter compared to the side of the base element facing the neighbouring conveying element, whereby the overall height of the brush element is shorter towards the associated conveying element compared to the side facing the neighbouring conveying element.

However, the varying height of the brush element is generated by the deflector elements having varying lengths, such that the deflector elements towards the associated conveying element are shorter, compared to the side of the base element facing the neighbouring conveying element. This provides a support surface of the brush element being substantial parallel with the conveying direction when the deflector elements are arranged at an oblique angle in relation to the conveying direction.

DETAILED DESCRIPTION

Figure 1A:
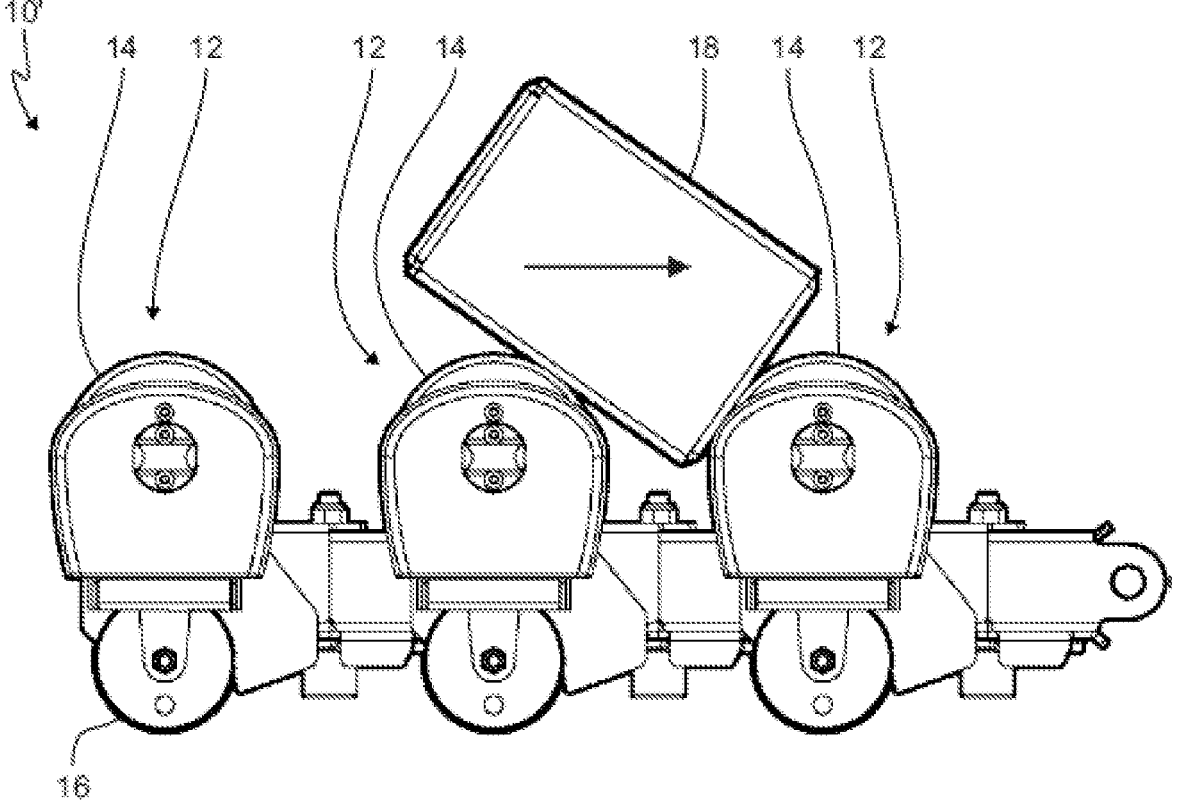
FIG. 1A is a side view of a known conveying system.

The present invention will now be described more fully hereinafter with reference to the accompanying drawings, in which exemplary embodiments of the invention are shown. The invention may however be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

FIG. 1A is a side view of a known conveying system 10'. The conveying system 10' corresponds to the known system disclosed in e.g., EP1713704A1. The system 10' comprises a number of conveying elements 12 (shown as three elements), which are linked together to form a conveyer. The system comprises a linkage between the subsequently arranged conveyor elements 12, such that the individual conveying elements 12 around the linkage can arrange the individual conveying elements 12 at different angles in relation to each other. Hereby, the conveying system 10' can be arranged so as to have both a straight conveying path and a non-straight conveying path, which is necessary when loading and/or unloading objects to and/or from limited storage spaces, such as the cargo space within an aircraft hull.

The conveying elements 12 preferably each comprises at least one roller, such that an object 18, e.g. a package or luggage, etc., may be conveyed on the conveying system 10' from one conveying element 12 to the next, as shown in the direction of the arrow. The rollers can rotate in both directions, such that the object 18 may be conveyed in opposite directions.

Each conveying element 12 may comprise two separate rollers 14 having a coaxial rotation axis, or may preferably have a single longitudinal roller, preferably having two taper-shaped covering elements (at 14) being oppositely tapered at each end. For reasons of understanding, the tapered ends of each conveying element will be referred to as rollers 14.

Due to the necessity of the pivoting motion of the conveying elements, there is a relatively large gap between two neighbouring conveying elements. When the conveying elements are pivoted to arrange a non-straight conveying path, the one end of two neighbouring rollers will be close to each other, and the other ends will be separated by a greater gap (see FIG. 2B). This results in a large gap between the conveying elements in which an object will partly (as shown) or entirely fall.

Even when the conveying system 10 has a straight conveying path, as shown in FIG. 1A, objects 18, such as packages of a relatively small size compared to the gap, will tend to partly or fully fall in the gap, causing the conveying path to be blocked.

Figure 1B:
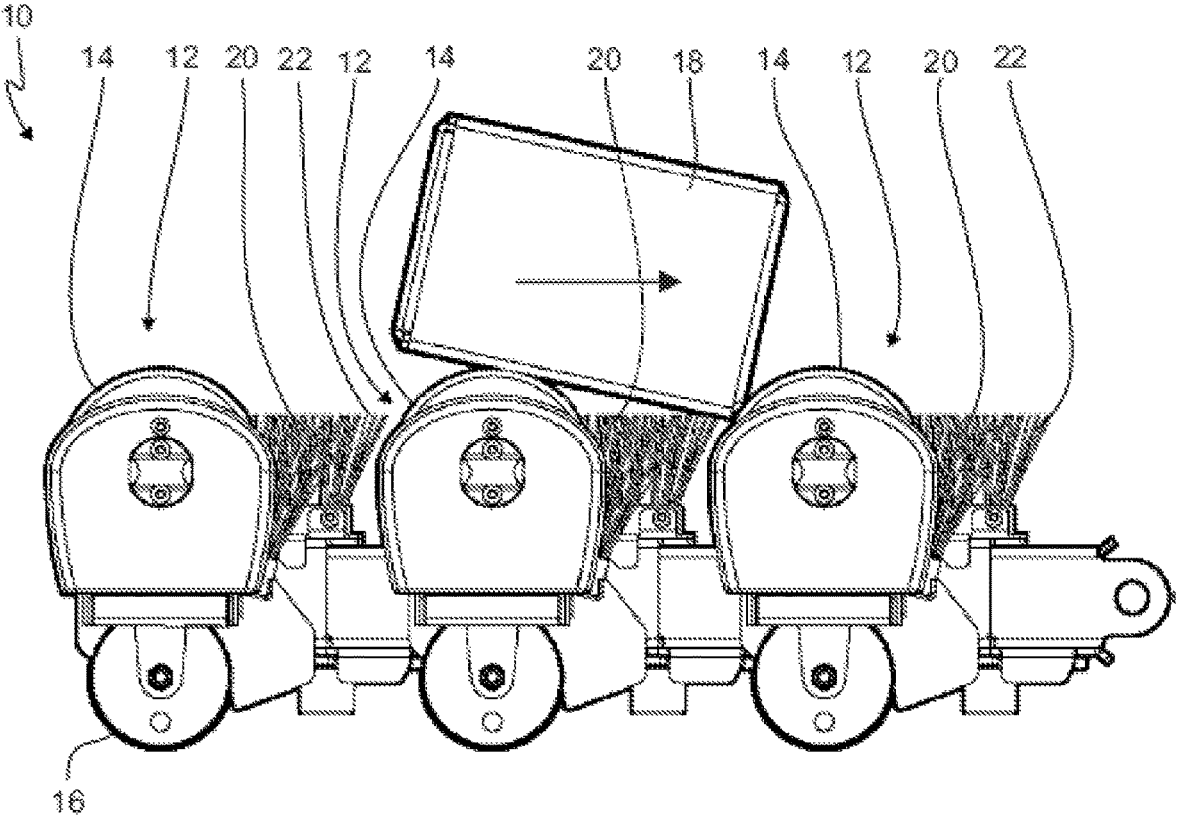
FIG. 1B is a side view of a conveying system.

FIG. 1B is a side view of a conveying system 10.

The conveying elements 12 shown in the product conveying system 10 in FIG. 1B correspond to the conveying elements illustrated in FIG. 1A. The product conveying system 10 further comprises a product support system having a first brush element 20 and a second brush element 22. The system 10 in FIG. 1B corresponds to the system 10', and each conveying element 12 therefore comprises two rollers 14 (only one roller 14 is shown for each conveying element 12). Each conveying element 12 comprises two first brush elements 20, each first brush element 20 being associated to a conveying element adjacent the rollers 14.

Between the rollers 14 of each conveying element 12 there is arranged a roller shaft 34, to which the rollers 14 are mounted with a mutual distance. Each conveying element further comprises a second brush element 22 associated with the conveying element adjacent the roller shaft 34, such that each second brush element 22 is arranged in between two first brush elements 20.

As can be seen in FIG. 1B, the first brush element 20 and the second brush element comprise a number of deflector elements (26, 26') (shown in detail in FIG. 4A-4C), arranged as flexible brush fibres. The deflector elements (26, 26') are connected to a base element (24, 24') (shown in FIG. 4A-4C), which base elements (24, 24') are connected to the conveying element 12.

FIG. 1B clearly shows that at least some of the deflector elements (26, 26') are arranged at an oblique angle in relation to a conveying direction. This provides the possibility of arranging the first brush elements 20, specifically the base elements 24 of the first brush elements 20, closer to the associated conveying element compared to the neighbouring conveying element. This results in an advantageous embodiment where the individual conveying elements may by pivoted, as shown in FIG. 2B, without the base element 24 of the first brush elements 20 colliding with the neighbouring conveying element 12. The subsequently arranged conveying elements 12 are thus able to pivot and function regardless of the first or second brush elements 20, 22.

As the base elements 24, 24' are arranged close to the associated conveying element, and the deflector elements 26, 26' are arranged at an oblique angle in relation to the conveying direction, a major part of the gap in the conveying surface between the two neighboring conveying elements is filled out with the deflector elements 26, 26', whereby a conveyed object 18 is supported by the support system without falling partly or entirely into the gap. Any blockage of the product conveying system is hereby avoided.

Figure 2A:
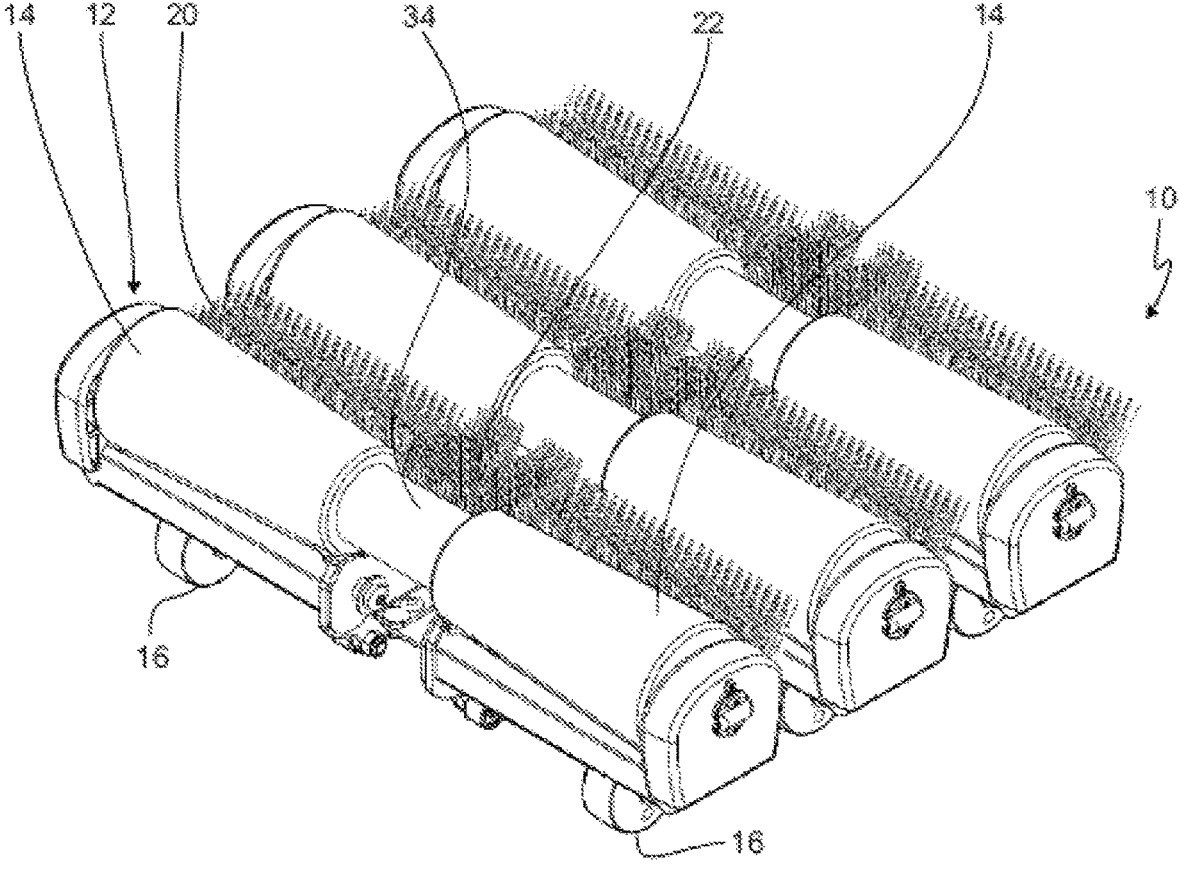
FIG. 2A is a perspective view of a conveying system.
Figure 2B:
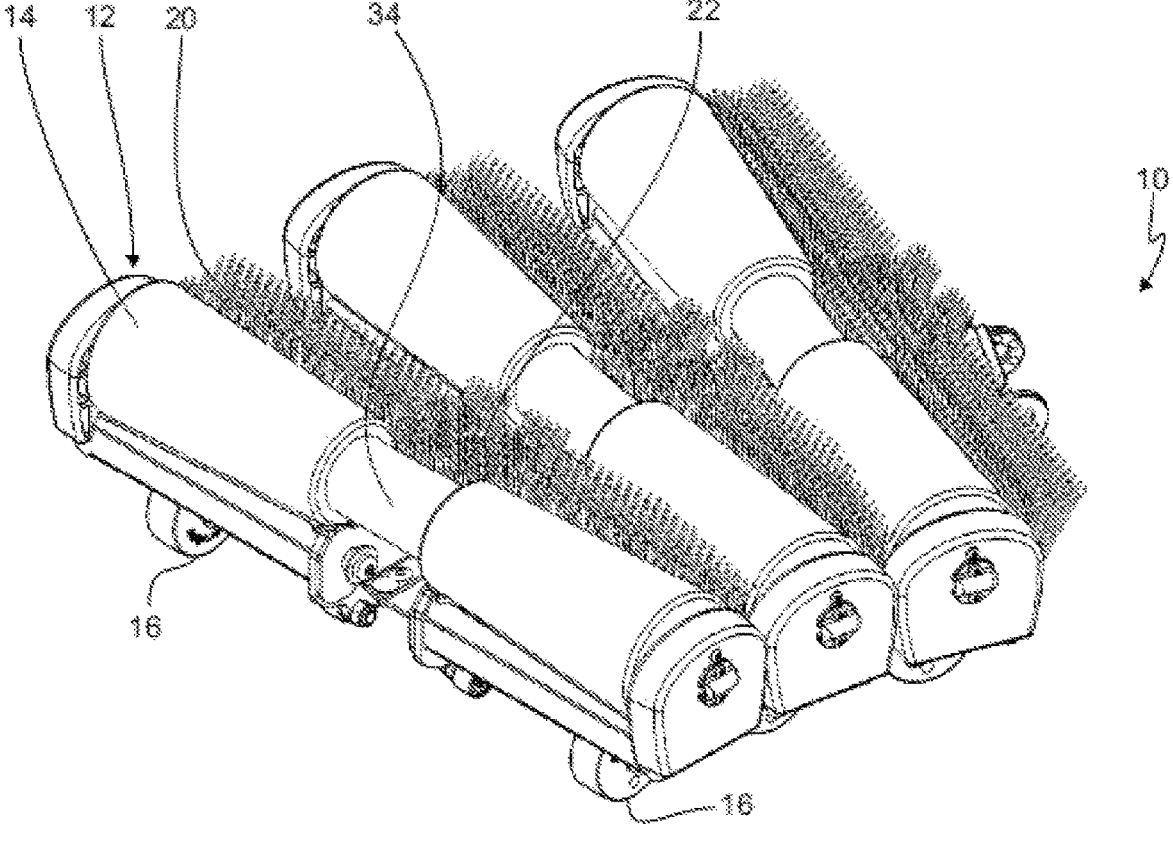
FIG. 2B is a perspective view of a conveying system.

FIG. 2A is a perspective view of a conveying system 10.

The conveying system 10 is arranged with at straight conveying path and is shown with three conveying elements 12. It is obvious that the conveying system 10 can be arranged with more or fewer conveying elements, dependent on the needed length of the conveying path.

Each conveying element 12 of the system 10 is associated with two first brush elements 20 and a second brush element 22, where the brush elements 20, 22 are connected to a frame of the conveying element. The brush elements 20, 22 comprise deflector elements 26, 26' arranged as brush fibres and arranged such that the brush fibres span substantially the entire gap between two neighbouring conveying elements 12.

FIG. 2B shows the same system 10 as illustrated in FIG. 2A, but where the system 10 has a non-straight conveying path. It is clearly shown that, due to the pivoted conveying elements, the gap between two neighbouring elements is smaller at one end of the rollers compared to the opposite end of the rollers. At the end with the smallest gap, the first brush element 20 is partly compressed from both sides by the opposing rollers, and as the base element is arranged towards the associated conveying element, preferably within, or partly within the vertical boundary of the associated roller, the neighbouring conveying element does not collide with the base element 24.

Figure 3A:
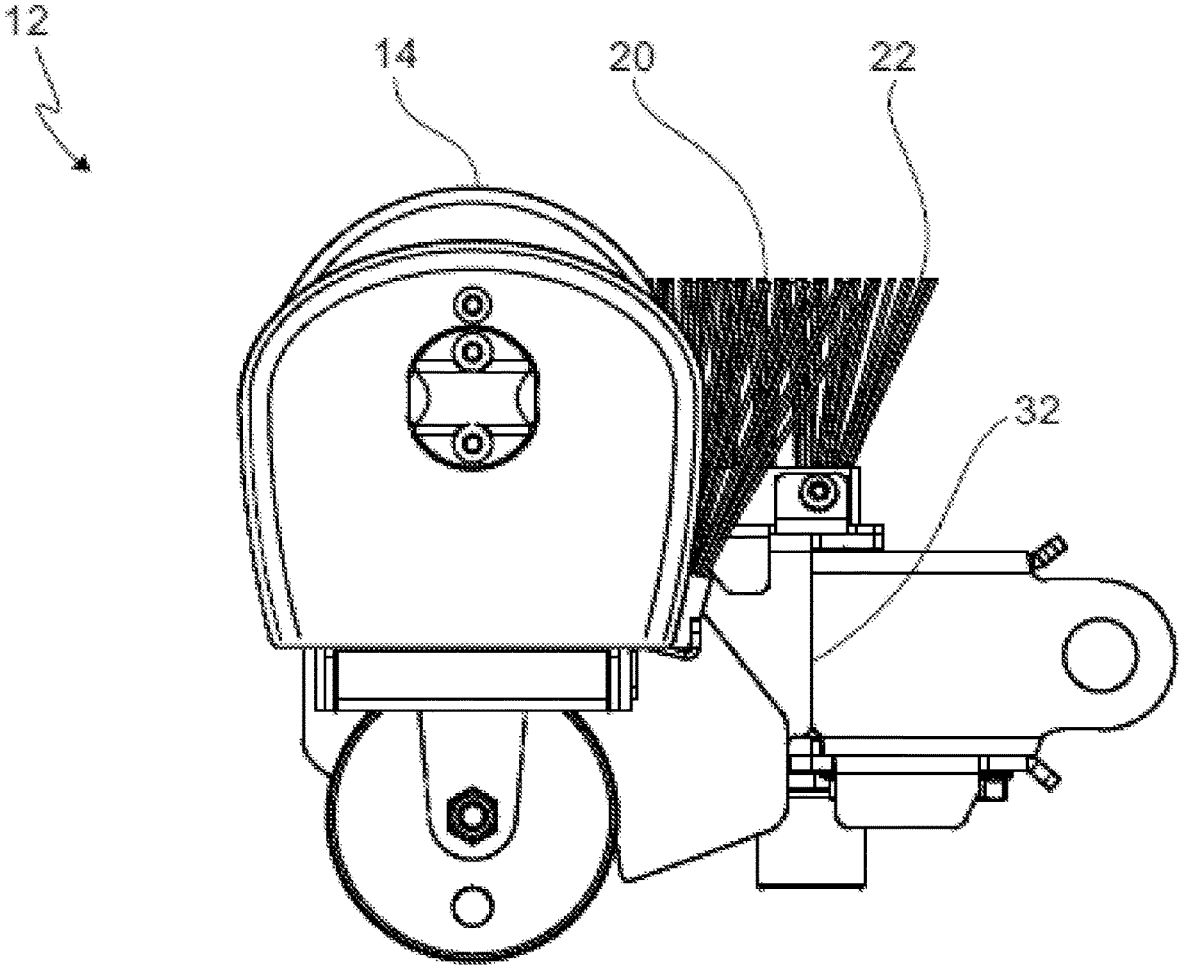
FIG. 3A is a side view of a conveying element having a product support system.

FIG. 3A is a side view of a conveying element having a product support. The conveying element 12 is arranged with a first brush element 20 and a second brush element 22, each element having a number of brush fibers 26 arranged with a spread. The brush elements 20, 22 are connected to the conveying element 12 via brackets and are preferably removably connected, such that the individual brush elements can be removed or interchanged. FIG. 3A clearly shows the first brush element 20 having brush fibers 26 with greater lengths than the second brush element 22, as the second brush element 22 is arranged above the link element 32 and therefore at a higher level than the first brush element.

Figure 3B:
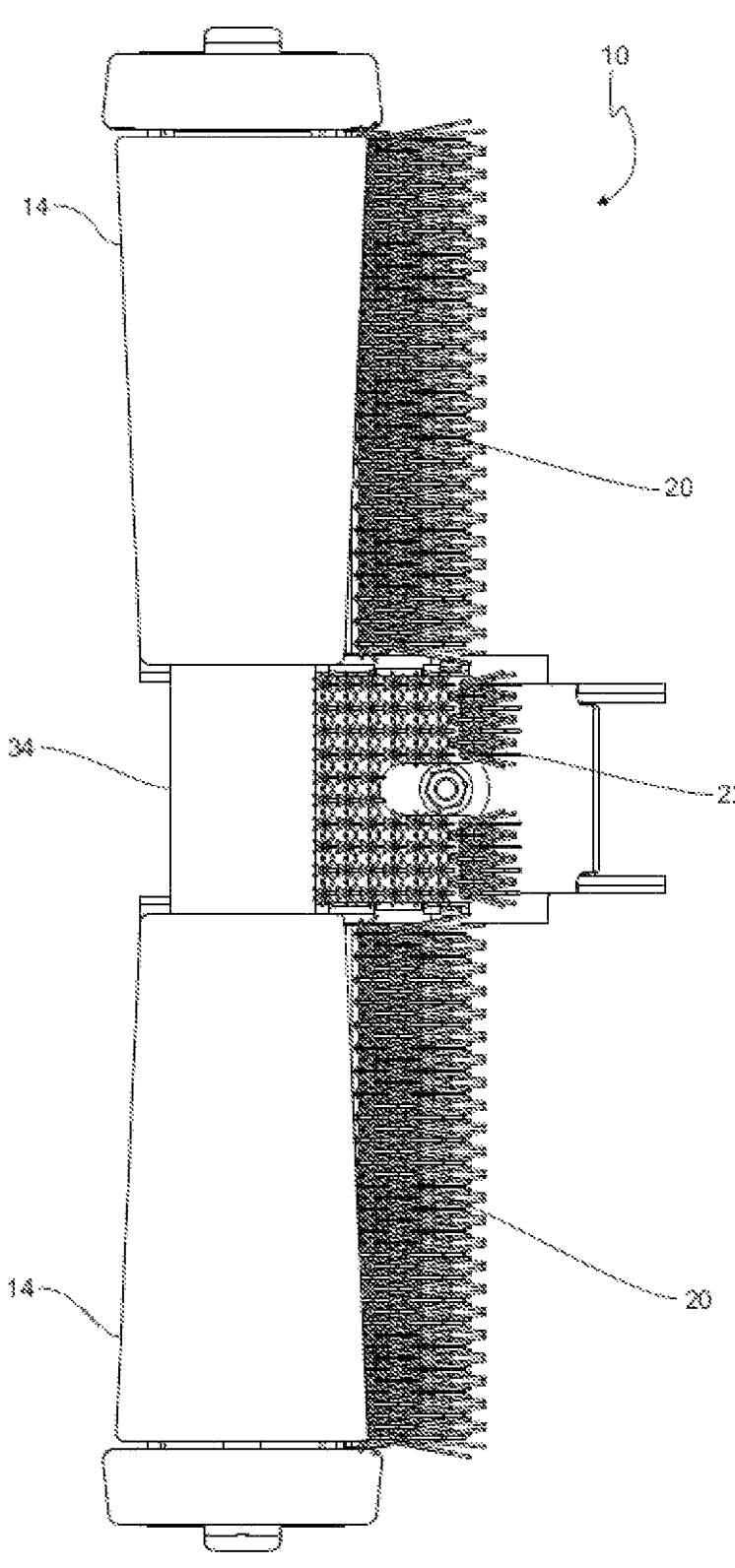
FIG. 3B is an upper view of a conveying element having a product support system.

FIG. 3B is an upper view of a conveying element 12 having a product support system. The conveying element 12 is arranged with two first brush elements 20 and a second brush element 22 above the link element between the first brush elements 20.

The first brush element 20 is arranged in relation to the roller 14, such that the base elements 24 are arranged partly under the at least one roller (14), in relation to the conveying direction. Especially an outer end of the first brush elements 20 is arranged within the horizontal periphery of the rollers, such that when the conveying element 12, when connected to another conveying element 12, may rotate via the link element 32 without the first brush element 20 limiting the movement.

Figure 4A:
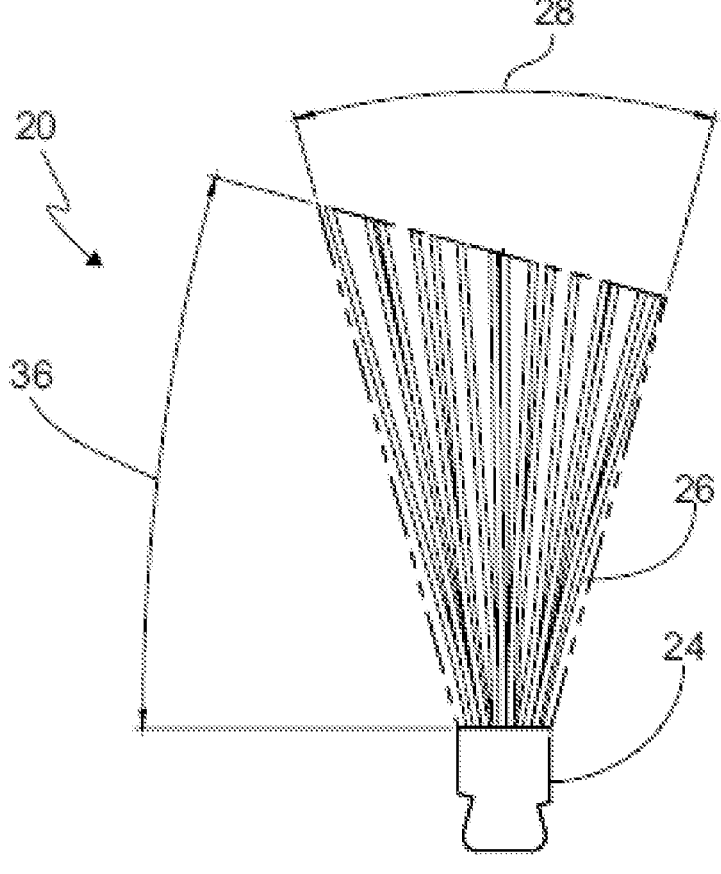
FIG. 4A is a side view of a product support system.

FIG. 4A is a side view of a product support system. The figure clearly shows that the deflector elements 26 are arranged with a spread 28 and that the height of the deflector elements decreases from one side to the other, such that the upper end of the deflector elements 26 forms an inclined support surface, which, when the brush element 20 is connected to the conveying element 12, is substantial parallel with the conveying direction.

The base element 24 is arranged with a shape, shown as a dovetail shape, such that it can be removably connected to a corresponding bracket or rail mounted on a conveying element.

Figure 4B:
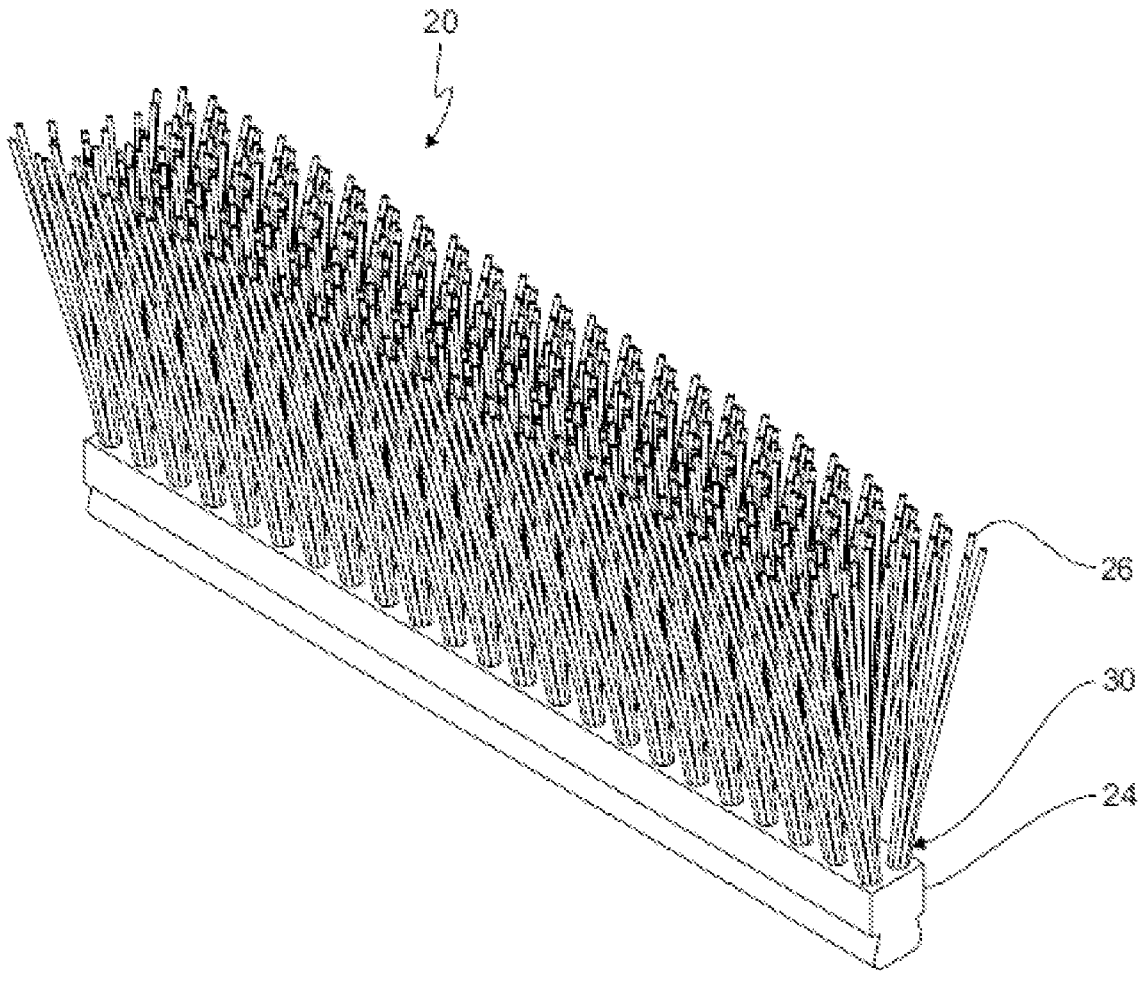
FIG. 4B-4C are perspective views of a product support system.
Figure 4C:
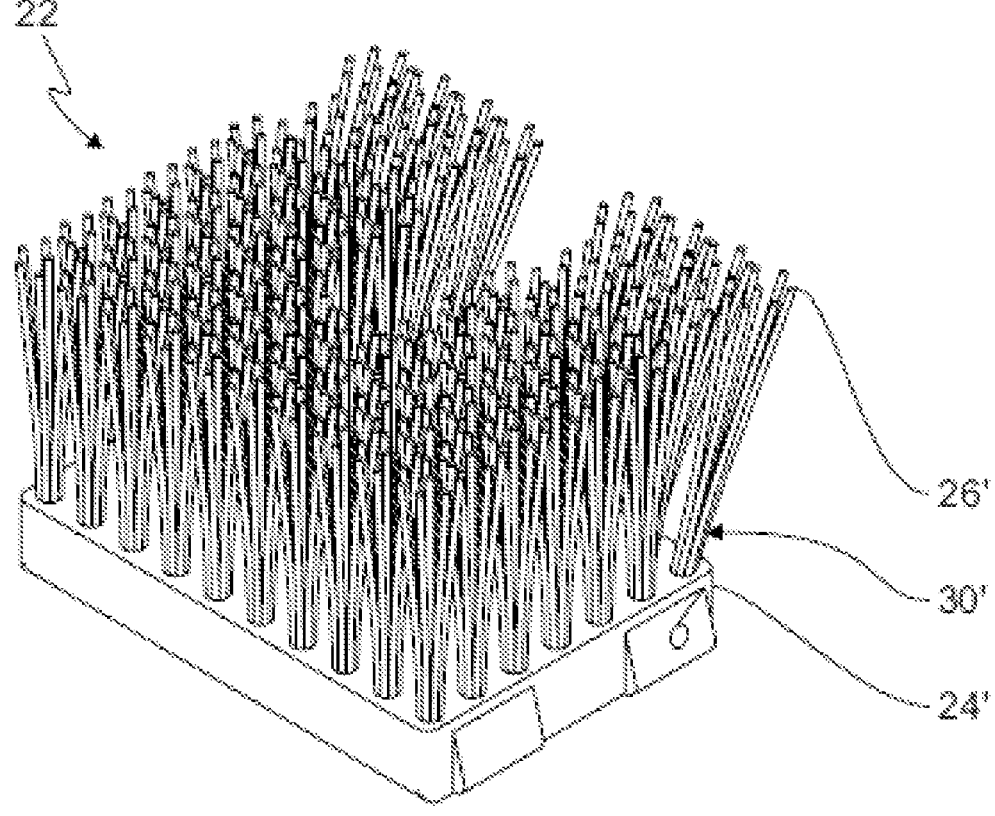

FIG. 4B-4C show perspective views of the first brush element 20 and the second brush element 22. The base element 24' of the second brush element 22 is shown with two inclined connection flanges for connecting the link element, but the base element 24' may have any other suitable shape for performing the same function. It is shown that part of the base element 24' comprises a recess which is devoid of deflector elements 26'. As can be seen from FIG. 3B, the recess accommodates the connection bolt of two interconnected link elements of two subsequent conveyor elements 12, such that the product support system can easily be retrofitted to an existing conveying system.

LIST OF REFERENCE NUMBERS

10 Product conveying system
10' Known product conveying system
12 Conveying element
14 Roller
16 Wheels
18 Object
20 First brush element
22 Second brush element
24, 24' Base element
26, 26' Deflector elements
28 Spread
30, 30' Bundle
32 Link element
34 Roller shaft
36 Inclination

What is claimed is:

1. A product conveying system for conveying objects, such as luggage or packages, comprising:
    a number of subsequently arranged conveying elements defining a conveying direction, wherein each conveying element comprises at least two subsequently arranged conveying rollers or two subsequently arranged conveyor belts, wherein a gap is formed between any two of said subsequently arranged conveying elements; and at least one brush element disposed within each gap between two subsequently arranged conveying elements for supporting said objects to be conveyed and preventing objects from getting stuck within the gap between two subsequently arranged conveying elements, wherein said subsequently arranged conveying rollers or subsequently arranged conveyor belts comprise a moveable conveying surface for contacting said objects, wherein each brush element comprises a base element located within the gap between two subsequently arranged conveying elements and a number of elongated deflector elements extending from said base element, and wherein said elongated deflector elements form an oblique angle in relation to said conveying direction.

2. The product conveying system of claim 1, wherein said brush element is elongated and arranged such that a longitudinal direction of said brush element is substantial perpendicular to said conveying direction in a horizontal plane.

3. The product conveying system of claim 1, wherein said base element of said at least one brush element is arranged offset in relation to a centerline between two subsequently arranged conveying elements.

4. The product conveying system of claim 1, wherein said conveying elements comprise at least two subsequently arranged rollers and a link element arranging as a connection between said rollers.

5. The product conveying system of claim 4, wherein two subsequently arranged conveying elements, via said link, are pivotally arranged in relation to each other around a vertical axis.

6. The product conveying system of claim 4, wherein said base element of said at least one brush element is arranged at least partly under said at least one roller.

7. The product conveying system of claim 4, further comprising a second brush element for supporting said objects, the second brush element having a base element and a number of elongated deflector elements connected to said base element, said second brush element being connected above said link element between subsequently arranged conveying elements.

8. The product conveying system of claim 1, wherein said deflector elements are arranged at different angles in relation to a direction perpendicular to said conveying direction, defining a spread of said angles.

9. The product conveying system of claim 8, wherein said spread of said first brush element increases from one end towards an opposite end of said first brush element.

10. The product conveying system of claim 8, wherein said first brush element is in contact with one of said conveying elements such that said increase of said spread is influenced by said contact.

11. The product conveying system of claim 8, wherein said angles define a spread of approximately 10-50 degrees.

12. The product conveying system of claim 1, wherein said deflector elements comprise a number of bundles of brush fibers.

13. The product conveying system of claim 12, wherein at least one of said bundles comprises a number of brush fibers arranged at different angles in relation to said conveying direction.

14. A product support system for use in a product conveying system, comprising:

at least two subsequently arranged conveying elements having a gap formed therebetween; and at least a first brush element disposed within said gap between said conveying elements for supporting said objects to be conveyed and preventing objects from getting stuck in the gap between the two subsequently arranged conveying elements, said first brush element having a base element located within the gap between two subsequently arranged conveying elements and a number of elongated deflector elements connected to and extending from an upper surface of said base element and suitable for being connected to said conveying elements at an oblique angle in relation to a conveying direction, said deflector elements being arranged at different angles and an upper end of said deflector elements defining a deflector surface having an area covering a larger surface area compared to said upper surface of said base element.

15. The product conveying system of claim 8, wherein said angles define a spread of approximately 20-40 degrees.

16. The product conveying system of claim 8, wherein said angles define a spread of approximately 25-35 degrees.

17. The product conveying system of claim 1, wherein said brush elements are removably connected to said conveying elements.

18. The product conveying system of claim 7, wherein said elongated deflector elements of said first brush elements are longer than said elongated deflector elements of said second brush elements.

* * * * *